(12) United States Patent
Ansel et al.

(10) Patent No.: US 9,483,473 B2
(45) Date of Patent: Nov. 1, 2016

(54) HIGH AVAILABILITY ARCHITECTURE FOR A CLOUD-BASED CONCURRENT-ACCESS COLLABORATION PLATFORM

(71) Applicant: Box, Inc., Los Altos, CA (US)

(72) Inventors: Michael Ansel, Los Altos, CA (US); Miles Spielberg, Sunnyvale, CA (US); Yuan Cheng, Los Altos, CA (US); Lance Co Ting Keh, Los Altos, CA (US); Antoine Boulanger, San Francisco, CA (US); Jonathan Berger, Los Altos, CA (US); Komal Mangtani, Los Altos, CA (US); Kevin Gao, San Francisco Bay, CA (US); Remington Wong, San Francisco Bay, CA (US); Naeim Semsarilar, San Carlos, CA (US); Yingming Chen, Los Altos, CA (US); Florian Jourda, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 227 days.

(21) Appl. No.: 14/474,507

(22) Filed: Sep. 2, 2014

(65) Prior Publication Data

US 2015/0081773 A1   Mar. 19, 2015

Related U.S. Application Data

(60) Provisional application No. 61/877,938, filed on Sep. 13, 2013.

(51) Int. Cl.
*G06F 15/16* (2006.01)
*G06F 17/30* (2006.01)
(Continued)

(52) U.S. Cl.
CPC ......... *G06F 17/30011* (2013.01); *G06F 11/14* (2013.01); *G06F 17/2288* (2013.01);
(Continued)

(58) Field of Classification Search
CPC ............... G06F 17/30011; G06F 17/2288; G06F 17/3089; G06F 11/14; H04L 29/08261; H04L 29/0827; H04L 29/08297; G06Q 10/10
See application file for complete search history.

(56) References Cited

U.S. PATENT DOCUMENTS

| 5,301,348 A | 4/1994 | Jaaskelainen |
| 5,576,946 A | 11/1996 | Bender et al. |

(Continued)

FOREIGN PATENT DOCUMENTS

| CA | 2724521 | 11/2009 |
| CN | 101997924 A | 3/2011 |

(Continued)

OTHER PUBLICATIONS

Extended Search Report for EP131832800, Applicant: Box, Inc. Mailed Aug. 25, 2014, 7 pages.

(Continued)

*Primary Examiner* — Krisna Lim
(74) *Attorney, Agent, or Firm* — Perkins Coie LLP

(57) ABSTRACT

Embodiments in the present disclosure include systems and methods related to a high-availability architecture for a cloud-based concurrent-access collaboration platform. The disclosed technology relates to an active data center which includes multiple document server instances that handle user requests for concurrently accessing documents. Multiple document server instances are implemented on a single physical server. This architecture uses an instance assignment manager to assign documents to the document server instances, a primary repository to store backup snapshots of the documents, and a datastore to store all changes made to the documents. The disclosed technology also involves a backup data center that can be swapped with the active data center automatically.

11 Claims, 12 Drawing Sheets

(51) Int. Cl.
*G06F 11/14* (2006.01)
*G06F 17/22* (2006.01)
*H04L 29/08* (2006.01)
*G06Q 10/10* (2012.01)

(52) U.S. Cl.
CPC ........... *G06F17/3089* (2013.01); *G06Q 10/10* (2013.01); *H04L 29/0827* (2013.01); *H04L 29/08261* (2013.01); *H04L 29/08297* (2013.01)

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,893,126 A | 4/1999 | Drews et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,097,390 A | 8/2000 | Marks |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,789,109 B2 | 9/2004 | Samra et al. |
| 6,859,909 B1 | 2/2005 | Lerner et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,107,549 B2 | 9/2006 | Deaton et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,435 B1 | 12/2006 | Day et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,243,299 B1 | 7/2007 | Rubin et al. |
| 7,246,118 B2 | 7/2007 | Chastain et al. |
| 7,275,244 B1 | 9/2007 | Charles Bell et al. |
| 7,305,436 B2 | 12/2007 | Willis |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,437,421 B2 | 10/2008 | Bhogal et al. |
| 7,467,415 B2 | 12/2008 | Carter |
| 7,496,830 B2 | 2/2009 | Rubin et al. |
| 7,496,841 B2 | 2/2009 | Hadfield et al. |
| 7,543,000 B2 | 6/2009 | Castro et al. |
| 7,581,221 B2 | 8/2009 | Lai et al. |
| 7,620,565 B2 | 11/2009 | Abelow |
| 7,627,831 B2 | 12/2009 | Chiu et al. |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,930,418 B2 | 4/2011 | Samra et al. |
| 7,937,663 B2 | 5/2011 | Parker et al. |
| 7,958,453 B1 | 6/2011 | Taing |
| 7,962,853 B2 | 6/2011 | Bedi et al. |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,374,944 B2 | 2/2013 | Robb |
| 8,429,540 B1 | 4/2013 | Yankovich et al. |
| 8,464,161 B2 | 6/2013 | Giles et al. |
| 8,527,549 B2 | 9/2013 | Cidon |
| 8,549,066 B1 | 10/2013 | Donahue et al. |
| 8,549,511 B2 | 10/2013 | Seki et al. |
| 8,607,306 B1 | 12/2013 | Bridge et al. |
| 8,682,973 B2 | 3/2014 | Kikin-Gil et al. |
| 8,706,810 B2 | 4/2014 | Vishnubhatla et al. |
| 8,756,513 B1 | 6/2014 | Schmieder et al. |
| 8,849,955 B2 | 9/2014 | Prahlad et al. |
| 8,892,679 B1 | 11/2014 | Destagnol et al. |
| 9,053,079 B2 | 6/2015 | Bailor et al. |
| 9,063,912 B2 | 6/2015 | Seibert, Jr. et al. |
| 9,069,743 B2 | 6/2015 | Kotler et al. |
| 9,223,635 B2 * | 12/2015 | Huang ................ H04L 41/5054 |
| 9,224,073 B2 | 12/2015 | Okajima |
| 9,235,268 B2 | 1/2016 | Arrasvuori et al. |
| 9,252,962 B1 | 2/2016 | Valeti |
| 9,357,076 B2 * | 5/2016 | Rosenberg ............. H04M 3/56 |
| 2001/0027492 A1 | 10/2001 | Gupta |
| 2002/0091738 A1 | 7/2002 | Rohrbaugh et al. |
| 2002/0099552 A1 | 7/2002 | Rubin et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0009459 A1 | 1/2003 | Chastain et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |

(56) References Cited

U.S. PATENT DOCUMENTS

| | | |
|---|---|---|
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0172588 A1 | 9/2004 | Mattaway |
| 2004/0177138 A1 | 9/2004 | Salle et al. |
| 2004/0181579 A1 | 9/2004 | Huck et al. |
| 2004/0221239 A1 | 11/2004 | Hachigian et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0022229 A1 | 1/2005 | Gabriel et al. |
| 2005/0028006 A1 | 2/2005 | Leser et al. |
| 2005/0033813 A1 | 2/2005 | Bhogal et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0209808 A1 | 9/2005 | Kelbon et al. |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147810 A1 | 6/2008 | Kumar et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0094546 A1 | 4/2009 | Anzelde et al. |
| 2009/0106642 A1 | 4/2009 | Albornoz et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |

(56) References Cited

U.S. PATENT DOCUMENTS

| | | |
|---|---|---|
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209052 A1 | 8/2011 | Parker et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0249024 A1 | 10/2011 | Arrasvuori et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0036423 A1 | 2/2012 | Haynes, II et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0192099 A1 | 7/2012 | Carbonera et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0221937 A1 | 8/2012 | Patterson et al. |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0024418 A1 | 1/2013 | Sitrick et al. |
| 2013/0031208 A1 | 1/2013 | Linton et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080913 A1 | 3/2013 | Rodrig et al. |
| 2013/0080919 A1 | 3/2013 | Kiang et al. |

(56) References Cited

U.S. PATENT DOCUMENTS

| | | | |
|---|---|---|---|
| 2013/0080966 A1 | 3/2013 | Kikin-Gil et al. | |
| 2013/0091440 A1 | 4/2013 | Kotler et al. | |
| 2013/0097481 A1 | 4/2013 | Kotler et al. | |
| 2013/0117240 A1* | 5/2013 | Taylor | G06F 17/30132 707/690 |
| 2013/0117337 A1 | 5/2013 | Dunham | |
| 2013/0117376 A1 | 5/2013 | Filman et al. | |
| 2013/0124638 A1 | 5/2013 | Barreto et al. | |
| 2013/0138608 A1 | 5/2013 | Smith | |
| 2013/0138615 A1 | 5/2013 | Gupta et al. | |
| 2013/0151940 A1 | 6/2013 | Bailor et al. | |
| 2013/0159411 A1 | 6/2013 | Bowen | |
| 2013/0163289 A1 | 6/2013 | Kim et al. | |
| 2013/0167253 A1 | 6/2013 | Seleznev et al. | |
| 2013/0185347 A1 | 7/2013 | Romano | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0212486 A1 | 8/2013 | Joshi et al. | |
| 2013/0218978 A1 | 8/2013 | Weinstein et al. | |
| 2013/0239049 A1 | 9/2013 | Perrodin et al. | |
| 2013/0246932 A1 | 9/2013 | Zaveri et al. | |
| 2013/0262210 A1 | 10/2013 | Savage et al. | |
| 2013/0262862 A1 | 10/2013 | Hartley | |
| 2013/0268480 A1 | 10/2013 | Dorman | |
| 2013/0268491 A1 | 10/2013 | Chung et al. | |
| 2013/0275398 A1 | 10/2013 | Dorman et al. | |
| 2013/0275429 A1 | 10/2013 | York et al. | |
| 2013/0275509 A1 | 10/2013 | Micucci et al. | |
| 2013/0305039 A1 | 11/2013 | Gauda | |
| 2013/0311551 A1* | 11/2013 | Thibeault | G06F 9/5055 709/203 |
| 2013/0326344 A1 | 12/2013 | Masselle et al. | |
| 2014/0013112 A1 | 1/2014 | Cidon et al. | |
| 2014/0019497 A1 | 1/2014 | Cidon et al. | |
| 2014/0019498 A1 | 1/2014 | Cidon et al. | |
| 2014/0026025 A1 | 1/2014 | Smith | |
| 2014/0032489 A1 | 1/2014 | Hebbar et al. | |
| 2014/0032616 A1 | 1/2014 | Nack | |
| 2014/0033277 A1 | 1/2014 | Xiao et al. | |
| 2014/0033291 A1 | 1/2014 | Liu | |
| 2014/0052939 A1 | 2/2014 | Tseng et al. | |
| 2014/0068589 A1 | 3/2014 | Barak | |
| 2014/0150023 A1 | 5/2014 | Gudorf et al. | |
| 2014/0156373 A1 | 6/2014 | Roberts et al. | |
| 2014/0172595 A1 | 6/2014 | Beddow et al. | |
| 2014/0280961 A1* | 9/2014 | Martinez | H04L 41/5054 709/226 |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| VU | WO-0219128 A1 | 3/2002 |
| WO | WO-0007104 A1 | 2/2000 |
| WO | WO 2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Extended Search Report for EP141509422, Applicant: Box, Inc. Mailed Aug. 26, 2014, 12 pages.

Search Report for EP 13189144.2 Applicant: Box, Inc. Mailed Sep. 1, 2014, 9 pages.

Exam Report for GB1312874.9 Applicant: Box, Inc. Mailed Sep. 26, 2014, 2 pages.

Exam Report for GB1415126.0 Applicant: Box, Inc. Mailed Oct. 2, 2014, 8 pages.

Exam Report for GB1415314.2 Applicant: Box, Inc. Mailed Oct. 7, 2014, 6 pages.

Exam Report for GB1309209.3 Applicant: Box, Inc. Mailed Oct. 7, 2014, 3 pages.

Exam Report for GB1315232.7 Applicant: Box, Inc. Mailed Oct. 9, 2014, 5 pages.

Exam Report for GB1318789.3 Applicant: Box, Inc. Mailed Oct. 30, 2014, 6 pages.

Microsoft Windows XP Professional Product Documentation: How Inheritance Affects File and Folder Permissions, Apr. 11, 2014, 2 pages.

Exam Report for GB1317393.5 Applicant: Box, Inc. Mailed Nov. 7, 2014, 6 pages.

Exam Report for GB1311417.8 Applicant: Box, Inc. Mailed Nov. 7, 2014, 2 pages.

Exam Report for GB1311421.0 Applicant: Box, Inc. Mailed Nov. 7, 2014, 4 pages.

Exam Report for GB1316682.2 Applicant: Box, Inc. Mailed Nov. 19, 2014, 6 pages.

Exam Report for GB1312095.1 Applicant: Box, Inc. Mailed Nov. 19, 2014, 5 pages.

Exam Report for GB1313559.5 Applicant: Box, Inc. Mailed Nov. 4, 2014, 2 pages.

Zambonini et al., "Automated Measuring of Interaction with User Interfaces," Published as WOWO2007113573 Oct. 2007, 19 pages.

Matt V., "Comparison of Lightbox-type Modules," (http://web.archive.org/web/20130510120527/http://drupal.org/node/266126; dated May 10, 2013; last accessed Jun. 23, 2015, 15 pages.

Exam Report for GB1415314.2; Applicant: Box, Inc. Mailed Aug. 14, 2015, 2 pages.

"Average Conversion Time for a D60 RAW file?" http://www.dpreview.com, Jul. 22, 2002, 4 pages.

"Conceptboard", One-Step Solution for Online Collaboration, retrived from websites http://conceptboard.com and https://www.youtube.com/user/ConceptboardApp?feature=watch, printed on Jun. 13, 2913, 9 pages.

"How-to Geek, How to Sync Specific Folders With Dropbox," downloaded from the internet http://www.howtogeek.com, Apr. 23, 2013, 5 pages.

"Microsoft Office SharePoint 2007 User Guide," Feb. 16, 2010, pp. 1-48.

"PaperPort Professional 14," PC Mag. Com review, published Feb. 2012, Ziff Davis, Inc., 8 pages.

"PaperPort," Wikipedia article (old revision), published May 19, 2012, Wikipedia Foundation, 2 pages.

(56) References Cited

OTHER PUBLICATIONS

"Quickoffice Enhances Android Mobile office Application for Improved Productivity on latest Smartphone and Table Devices," QuickOffice Press Release, Nov. 21, 2011, OuickOffice Inc., 2 pages.
"QuickOffice," Wikipedia Article (old revision), published May 9, 2012, Wikiedia Foundation, 2 pages.
"Revloving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burns, "Developing Secure Mobile Applications for Android," Oct. 2008, Version 1.0, 1-28 pages.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXohange Users Manual," Version 1.15.15, Feb. 1, 2009, pp. 1-90.
Conner, "Google Apps: The Missing Manual," published by O'Reilly Media, May 27, 2008, 24 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 2, 2012, 2 pages.
Duffy, "The Best Flie-Syncing Services," pcmag.com, retrieved from the internet: http://www/pcmag.com, Sep. 28, 2012, 7 pages.
Exam Report for EP13158415.3, Applicant: Box, Inc. Mailed Jun. 4, 2013, 8 pages.
Exam Report for EP13168784.0, Applicant: Box, Inc. Mailed Nov. 21, 2013, 7 pages.
Exam Report for EP13177108.1, Applicant: Box, Inc. Mailed May 26, 2014, 6 pages.
Exam Report for EP13185269.1, Applicant: Box, Inc. Mailed Jan. 28, 7 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1308842.2, Applicant: Box, Inc. Mailed Mar. 10, 2014, 4 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 23, 2013, 5 pages.
Exam Report for GB1312264.3, Applicant: Box, Inc. Mailed Mar. 24, 2014, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1314771.5, Applicant: Box, Inc. Mailed Feb. 17, 2014, 7 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1318792.7, Applicant: Box, Inc. Mailed May 22, 2014, 2 pages.
Exam Report for GB132092.8, Applicant: Box, Inc. Mailed Dec. 20, 2013, 6 pages.
Exam Report for GB1410569.6, Applicant: Box, Inc. Mailed Jul. 11, 2014, 9 pages.
Gedymin, "Cloud computing with an emphasis on Google App Engine," Master Final Project, Sep. 2011, 146 pages.
Google Docs, http:web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875, Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/034765, Applicant: Box, Inc., Mailed Jan. 20, 2014, 15 pages.
International Search Report and Written Opinion for PCT/US2013/035404, Applicant: Box, Inc., Mailed Jun. 26, 2013, 11 pages.
International Search Report and Written Opinion for PCT/US2013/039782, Applicant: Box, Inc., Mailed Aug. 28, 2013, 15 pages.
John et al., "Always Sync Support Forums—View topic—Allway sync funny behavior," Allway Sync Support Forum at http://sync-center.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131932800, Applicant: Box, Inc. Mailed May 8, 2014, 5 pages.
Patent Court Document of Approved Judgement for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.

(56) References Cited

OTHER PUBLICATIONS

Rao, "Box Acquires Crocdoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. Mailed Feb. 7, 2014, 9 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Sommerer, "Presentable Document Format: Improved On-demand PDF to HTML Conversion," retrieved from the internet, http://research.microsoft.com, Nov. 2004, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.

* cited by examiner

HIGH AVAILABILITY ARCHITECTURE FOR A CLOUD-BASED CONCURRENT-ACCESS COLLABORATION PLATFORM

CROSS-REFERENCE TO RELATED APPLICATIONS

This application claims the benefit of U.S. Provisional Patent Application No. 61/877,938, filed Sep. 13, 2013, the contents of which are incorporated by reference in their entireties herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2013, Box, Inc., All Rights Reserved.

BACKGROUND

With the advancement in digital and online technologies, people now manage an abundance of information and are in constant communication with others regardless of time and location. Cloud-based collaboration platforms have been developed to support such lifestyles. It can be useful for such platforms to offer features that enable users to create, view, edit, annotate, store, share and otherwise manage information in a user-friendly and efficient manner.

In order to provide concurrent collaborative access to that information, and provide concurrent updates to that data in real-time, various factors need to be accounted for in order to prevent data loss, maintain accessibility, prevent overloading of system resources, maintain storage, and maintain privacy.

DETAILED DESCRIPTION

Figure 1:
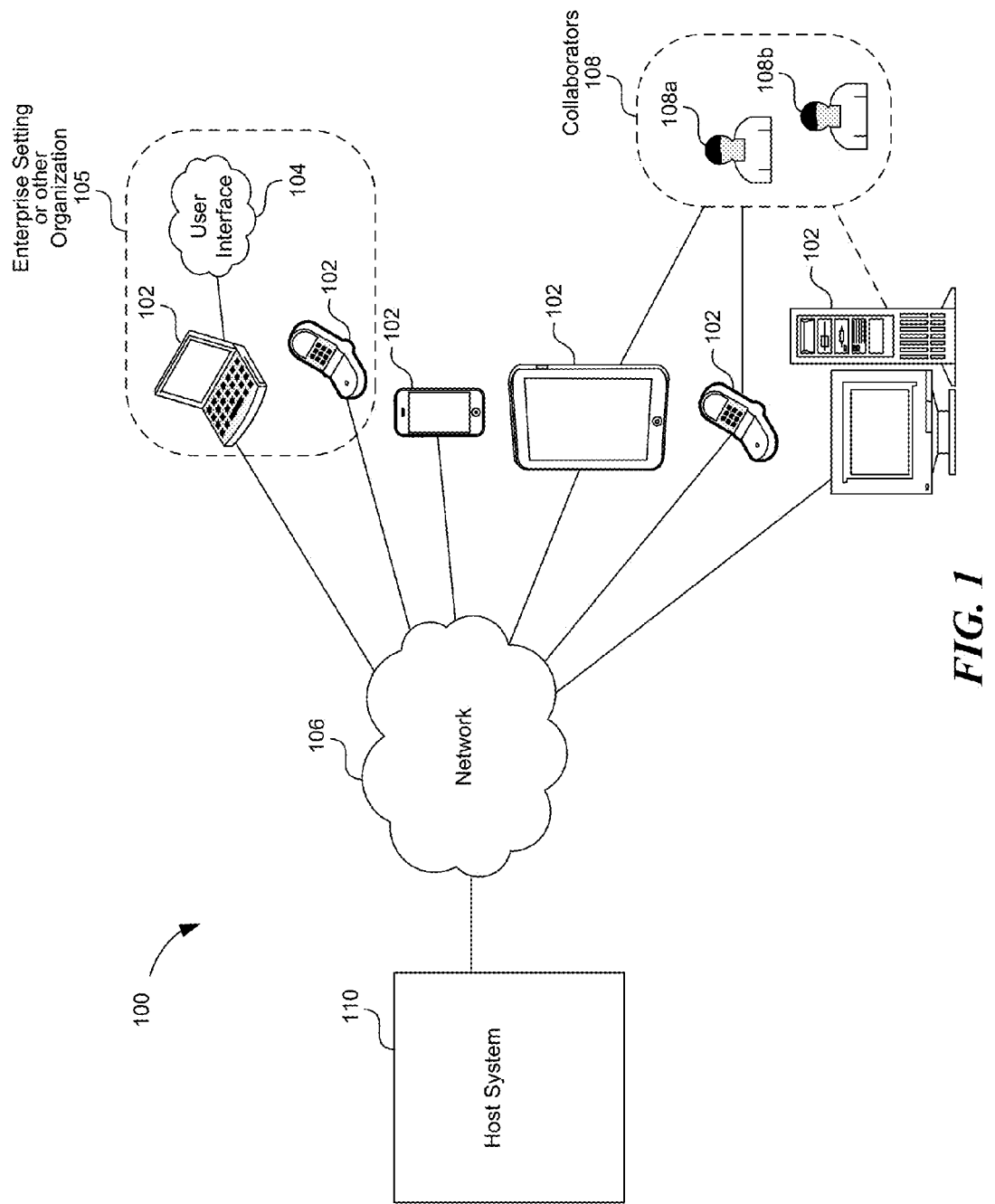
FIG. 1 depicts a diagram illustrating an example environment in which users communicate with a cloud-based concurrent-access collaboration platform.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for providing high availability for web-based document creation and editing in a collaborative environment including a cloud-based platform (e.g., cloud-based file sharing, collaboration, and/or storage platform/service). The system architecture includes various components which allow for real-time data synchronization between a plurality of collaborators, while avoiding latency issues due to increased user activity on any one particular work item as well as increased number of work items which are currently being accessed. In other words, the scalability of the system is dynamic and is automatically determined based on system use at any given time.

The methods and system used to maintaining high availability for collaborative editing in a cloud-based platform are further discussed in the following description, beginning with a general overview of a collaborative cloud-based platform with reference to FIG. 1.

FIG. 1 contains a diagram illustrating an example environment 100 in which users or collaborators communicate with a cloud-based concurrent-access collaboration platform (cloud-based service/platform, collaboration workspace and/or cloud storage service). In general, a host system 110 hosts the collaboration platform which enables users to simultaneously create, view, edit, annotate, store, share and otherwise manage content in real-time or near real-time. As discussed in further detail with reference to FIG. 3, the host system 110 implements a high-availability architecture suited for handling the large volume of user requests during concurrent collaborative editing of a document created through the host system 110.

The client devices 102 can be any system and/or device, and/or any combination of devices/systems that is able to establish a communication or a connection, including wired, wireless, cellular connections with another device, a server and/or other systems such as the host server 110. The client devices 102 typically include a display and/or other output functionalities to present information and data exchanged between among the client devices 102 and/or the host server 110.

For example, the client devices 102 can include mobile, handheld or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, etc.), a phablet (e.g., HTC Droid DNS, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102 and host server 110 are coupled via a network 106. In some embodiments and the client devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through the network 106, a web-based collaboration environment or online collaboration platform (e.g., hosted by the host server 110). The collaboration environment, or platform, can have one or more collective settings 105 for an enterprise or an organization where the users are associated, and can provide a user interface 104 for the users to access such platform under the settings 105.

In general, the network 106, over which the client devices 102 and the host server 110 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
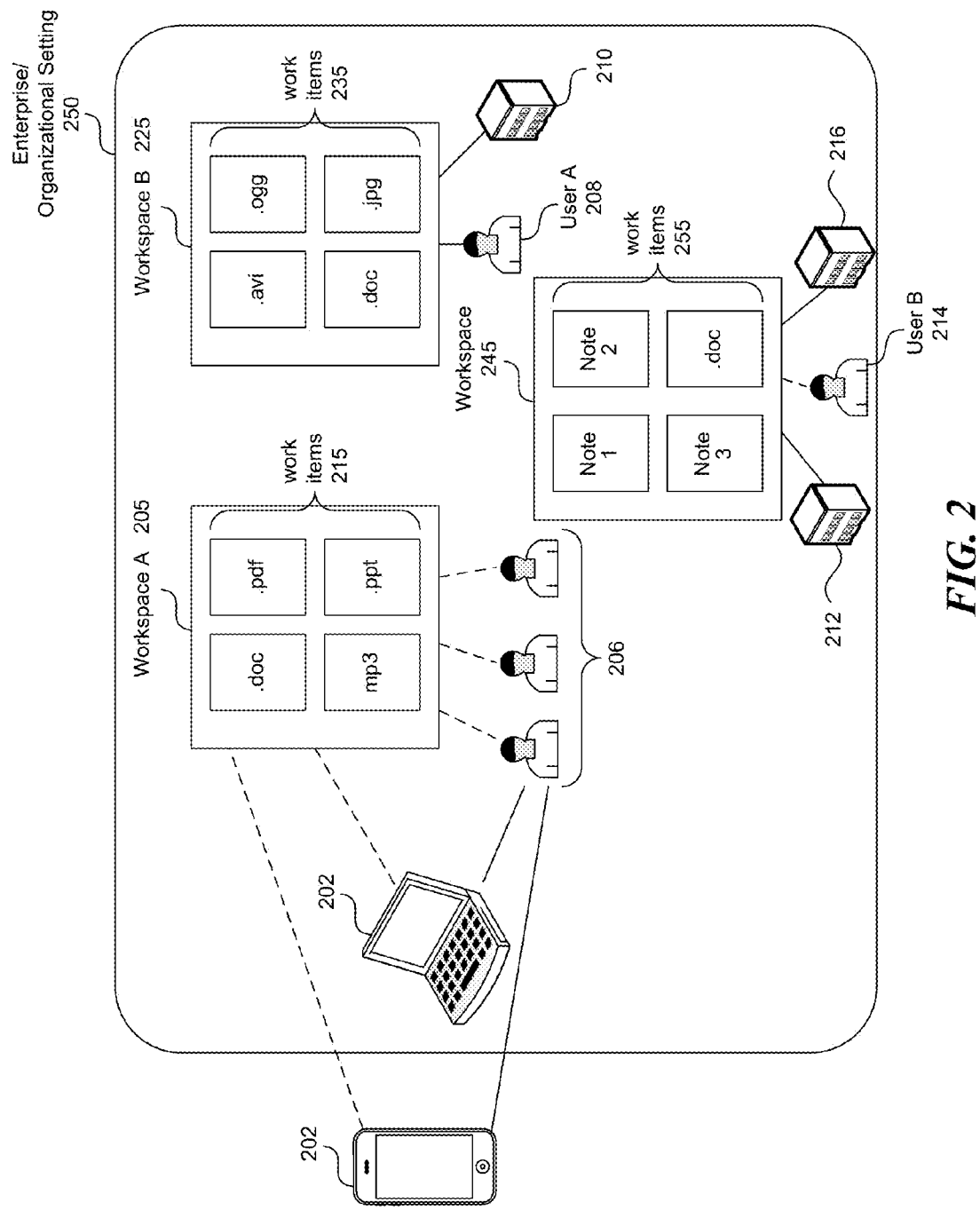
FIG. 2 depicts a diagram illustrating the collaboration platform deployed in an enterprise or other organizational setting.

FIG. 2 contains a diagram illustrating the collaboration platform deployed in an enterprise or other organizational setting 250 for organizing workspaces 205, 225 and 245 and work items 215, 235 and 255. The collaboration platform or environment hosts workspaces with work items that one or more users can access (e.g., view, edit, update, revise, comment, download, preview, tag, or otherwise manipulate, etc.). In some embodiments, the work items are also created by the user in the collaborative platform. A work item can generally include any type of digital or electronic content that can be viewed or accessed via an electronic device (e.g., client devices 202). For example, the work items 215 and 235 include general digital content, such as .pdf files, .doc, slides (e.g., Powerpoint slides), images, audio files, multimedia content, web pages, blogs, etc. In some embodiments, the work items 255 comprise "notes" or documents of a proprietary format, which support advanced and unique capabilities of data management and promote collaboration.

A workspace can generally refer to any grouping of a set of digital content managed by the collaboration platform. For example, the workspaces A 205 and B 225 include general digital content while the workspace 245, may include Notes only. In some embodiments, workspaces may be heterogeneous and include both general digital content and Notes. The grouping can be created, identified, or specified by a user or through other means, such as system or administrative settings. A user may be a creator user, owner user, editor user, or administrative user, for example.

In general, a workspace can be associated with a set of users or collaborators (e.g., collaborators 108) who have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content in the workspace, or any other designated user or collaborator associated with a particular workspace.

In general, the collaboration platform allows multiple users or collaborators to access or collaborate on work items such that each user can remotely see edits, revisions, comments, or annotations being made to specific work items through their own user devices in real-time. For example, a user can create a work item in a workspace for other users to access (e.g., for viewing, editing, commenting, signing-off or otherwise manipulating). The user can login to the online platform and create a "Note" (or any other type of work item) in an existing workspace or to a new workspace. The document can then be shared with existing users or collaborators in that workspace.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace 245 can be associated with work items 255. The work items 215, 235, and 255 can be unique to each workspace but are not required to be. For example, a particular work item or a Note can be associated with only one workspace. In additional embodiments, a work item, Note or both can be associated with multiple workspaces.

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208, and workspace N 245 can be associated with departments 212 and 216 and users shown as example user B 214.

Within a given workspace, collaborators of that workspace have simultaneous read/write access to a Note in the workspace. In other words, once a Note has been created and the creator of that note has invited other collaborators, or has created the note in a file location which already provides collaborative permission, each collaborator may edit the Note at the same time. Accordingly, each user concurrently accessing the Note may view the Note being edited in real-time without personally making those edits. In a concurrent fashion, each of the collaborators is able to make changes to the note or even edit the changes made by other collaborators. With Note workspaces, a separate list of collaborators can be specified at the Note level to override the list of collaborators at the workspace level, so that different Notes within the same workspace can be associated with different sets of collaborators. Additionally, the permissions and accessibility of the collaborators for each Note workspace may be specified by an owner or creator of a Note. For example, though some collaborators may be able to access and view the Note, those collaborators may not be able to edit or share the Note.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items (graphs, images, etc.) or content created, downloaded or edited can cause notifications to be generated for any given work item (note) or workspace (notebook). Such notifications can be sent to relevant users to notify them of actions surrounding a download, an edit, a change, a modification, a new file, a conflicting version, or upload of an edited or modified file.

In certain embodiments where notifications are presented in a user interface of the web-based collaboration platform, users can create action items (e.g., tasks) and delegate the action items to other users, e.g., collaborators on a work item 215, via the same interface. The collaborators 206 can be in the same workspace A 205 and can invite a new collaborator to join the workspace, for example. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some embodiments, the users can perform the tasks (e.g., review or approve or reject, etc.) via the same user interface.

In order to provide real-time editing within the collaborative environment described above, a high availability architecture for the system (e.g., host system 110 in FIG. 1) is utilized which is both highly scalable and fault tolerant. This high availability architecture is further described in the following paragraphs with reference to the remaining figures.

Figure 3:
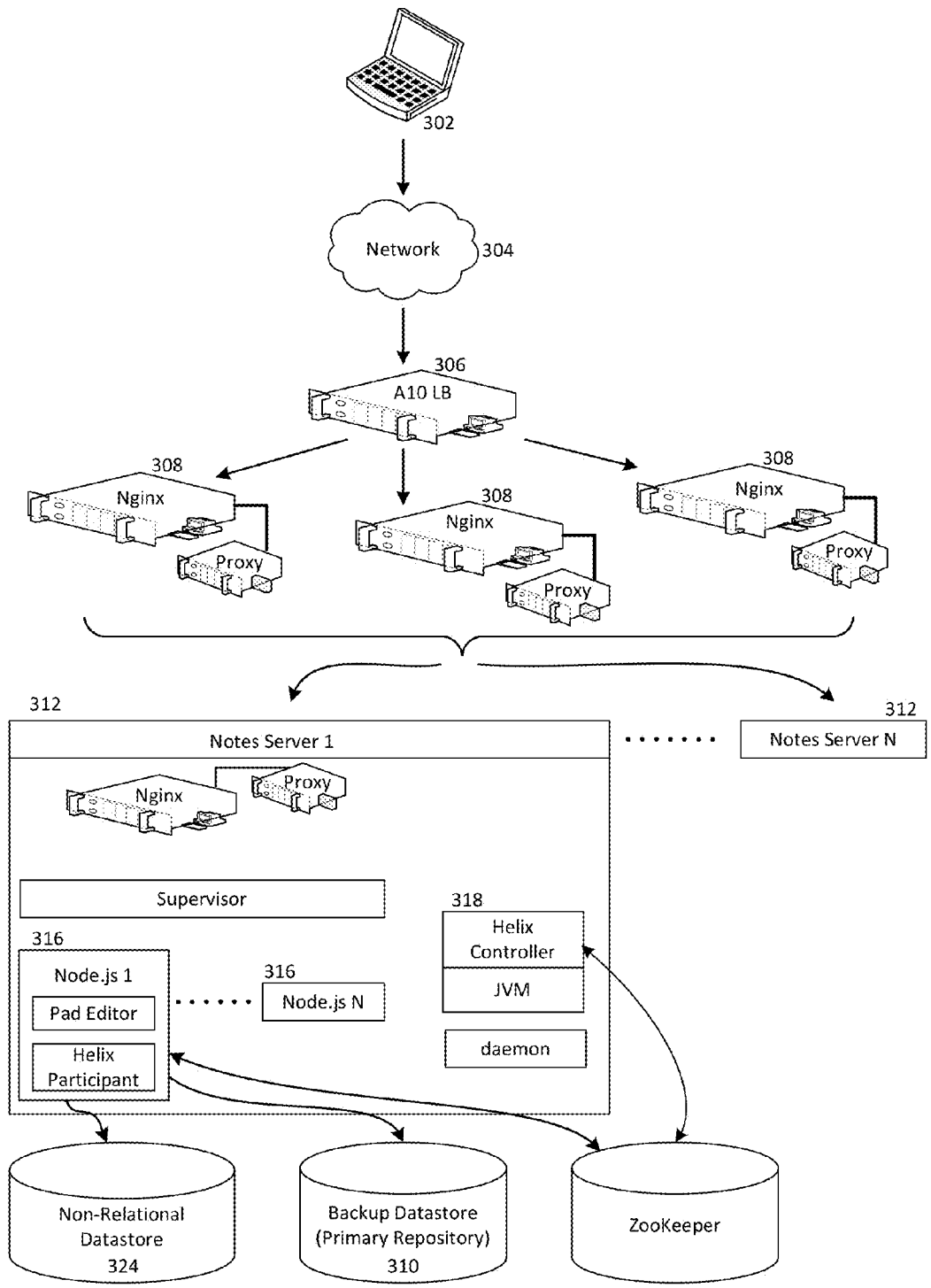
FIG. 3 depicts a diagram illustrating an example high-availability architecture supporting the cloud-based concurrent-access collaboration platform.

FIG. 3 contains a diagram illustrating an example high-availability architecture under which the collaboration platform is implemented. The system architecture may be implemented in one or more data centers. Each data center may include components such as a hardware load balancer, software load balancers, one or more data servers, and one or more file repositories (datastores). The data center components are typically within a single network and each data center is treated as an isolated stack.

Domain Name System (DNS) records dictate the data center to which each request first is routed. The data centers receive incoming access requests (e.g., to access Notes or other workspaces). In the architecture as described herein, two or more data centers are utilized, though only one data center is considered active at any given time for received access requests for Notes. The active data center is the only data center capable of accepting writes (edits) to a work item (e.g., Note).

A hardware load balancer (LB) 306 layer may be implemented in each data center. When an access request is received from a user (e.g., client device) 302, for example, manually configured public DNS records are used to route requests to the active data center's load balancer. The hardware LB layer may be implemented, for example, using A10 hardware load balancers. The hardware load balancers are used to route traffic to the correct Notes virtual IP (VIP). The hardware load balancer is also responsible for distributing traffic, or access requests equally (e.g., layer 4 round-robin) to the software load balancer layer.

A software LB 308 layer performs advanced, software-based load balancing of all incoming note requests to the dedicated Notes servers. The software LB layer can be implemented as one or more Nginx servers, for example. Each software LB server handles routing requests to the correct Notes server if the request is targeted to the same data center. If an incoming request is received at the non-active data center, then the software LB server will direct the request to the active data center. Additionally, the software LB server can handle reverse proxying for WebSocket requests and XHR polling. If a request for a static asset is received, the software LB server can hand off the request to an associated proxy server.

The software LB 308 layer may also include one or more proxy servers, such as an HAProxy server. The proxy server may provide layer-7 load balancing support for round robin requests by handling any incoming access requests for static assets on each of the nodes 316. The proxy server may also perform active server health checks.

The Notes servers 312 may provide the requested user access to a Note, as well as the concurrent editing, viewing, modifying, notifications, and backup storage for that Note, for example. The Notes server 312 can also perform secure socket layer (SSL) termination from the software LB layer. Each Note server 312 may have multiple Node.js instances and requests may be routed by an Nginx instance, for example. Also, similar to the software LB layer, each of the Nginx instances may be coupled to a proxy (e.g., HAProxy) server. So, the Notes server 312 may hand off any static assets requests to the proxy (HAProxy) server. The proxy server can handle on-server load balancing and health checks. For example, the proxy server may be responsible for load balancing static assets amongst the local (Node.js) instances of Notes.

To provide high-availability concurrent editing and access to each note, each physical Notes server hosts multiple instances of the Notes application. Accordingly, each instance can listen on a port unique to the physical host on which it is run. The instances can be implemented in a single-threaded run-time environment, such as Node.js. The Nginx instance hosted on a Notes server can be responsible for routing WebSocket and XHR polling requests received by the Notes server to the appropriate Notes instance. Each Notes server 312 may include various Notes instances 316, which may include a Node.js instance that includes pad editing functionality (e.g., Etherpad) and a Helix participant. Each Notes server 312 may also include a Helix controller and a Java Virtual Machine (JVM) 318. The Notes instance may also be referred to as a node in the following paragraphs.

Two types of access requests may be routed to a node 316. The first is static assets requests. As described in previous paragraphs, the static assets are handled by the proxy server. Static assets requests may also include the first handshakes made with a particular client (e.g., computer or other user device used to access the platform), such as when a particular client joins a Note. The static asset requests may be routed round robin to any given Notes instance in an active data center. Additionally, the static requests may be utilized to lookup information for the request, such as the address of the particular node to which the client should connect. The address lookup can be performed via a resource management process, such as Helix. The static asset requests are stateless can be handled by a differing architecture which does not rely on hardware load balancers, such as Node.js Express.

The second type of request received at a node 316 may be via Socket.IO. These include any stateful, asynchronous requests from clients. For example, the Socket.IO requests may include incoming user changesets (e.g., edits to a particular Note handled by that node), user cursor movements within the Note, and all other interactions with the editor implemented in the Note. Additionally, the Socket.IO requests may proxy all requests to the primary application programming interface (API) on the cloud-based collaborative platform.

To handle Socket.IO requests, such as incoming user changesets (edits to a Note), the node merges queued changes into the Note each 200 milliseconds (ms) via a method known as operational transformation (OT) in which a current change (operation) performed on the Note is based on the prior change (operation).

The node 316 is also responsible for persisting updated Notes to various locations within the system architecture. For example, updated versions of the Note are persisted to an in-memory cache of the Notes instance on which that node is located. The data in the buffering layer is actively encrypted using, for example, by calling encrypt_upload, a C-binary written by Box. The encrypt_upload binary returns the encrypted file and a data encryption key (DEK) in .meta format. The encrypted key is then sent to Interval Key Service (IKS) for a second round of encryption. IKS encrypts the DEK and returns a second (encrypted) key in a .meta2 format.

The in-memory cache (not shown) acts as a buffering layer to the non-relational datastore 324 on which an encrypted version of the Note is persisted from the Notes server. The encrypted Note may be stored in the datastore, for example, in multiple rows. There are four types of rows: meta2 rows, full text rows, revision rows, and annotation rows. Meta2 rows contain a single .meta2, e.g., encrypted DEK. Full text rows include a complete representation of the Note. Revision rows include information about an individual edit made by a single user. Annotation rows contain information about an annotation added to a Note. Each Note is associated with only one meta2 row and one full text row, but can be associated with numerous revision rows and annotation rows. So, the datastore 324 may be a persistent store for all Notes data (full-text, meta2, revisions, annotations) and all data within the datastore 324 may be encrypted. The datastore 324 may also be used as a persistent session store.

In one embodiment, for example, the datastore 324, may be implemented through Apache HBase and may also be referred to herein as a HBase, repository, intermediate repository, database, or any variation thereof. The datastore 324 may be utilized solely as a storage device and may handle a large volume of storage requests. Furthermore, as within HBase, the datastore 324 may be implemented in a cluster, one of which exists per data center. The clusters are configured for master-master replication. For each Note, the full text of the Note is persisted to the datastore 324 every ten (10) changesets (edits) or every six seconds (6 s), whichever occurs first. In further embodiments, the HBase may act as a first backup database from which the full text of a Note with current revisions (current state) is read if the Note is not within the memory (e.g., the in-memory cache).

The Note is also persisted to a second repository, which acts as a backup datastore and includes the up-to-date full text of the Note. The second repository may also be referred to a primary repository 310. If changes have been made to a Note, a job is queued to upload the Note to the primary repository 310. Upload jobs are distributed across the nodes in the active data center in order to facilitate load balancing in the data center. Each node 316 has an asynchronous procedure that checks for queued upload jobs every 1 s. For each upload request, the node uploads a snapshot of the Note's most up-to-date full text to the primary repository 310. The Note is uploaded, or persisted to the primary repository 310 less frequently, such as every ~30 seconds. Each upload to the primary repository 310 can also trigger search indexing and notifications to be sent to the collaborators of the Note that changes have been made to the Note. The primary repository 310 may be more reliable than the datastore since less data is exchanged. In addition to full text versions of Notes, the primary repository 310 can store versions of notebooks in which a Note being modified is located as well as indices and other related data to a particular Note. The primary repository 310 may be implemented, for example, in a MySQL database.

In addition to running the Notes application, each node can also run a second application to aid in load balancing and scalability of the Notes sever. For example, the application may include a Helix participant library. The Helix participant library can, for example, aid in listening to state changes in nodes and dropping and acquiring regions (acquiring a region means that the node assumes responsibility for serving requests for a particular set of Notes, and dropping that region means losing that responsibility). Additionally, the Helix participant library can claim ephemeral node for new nodes and announce membership of a Notes instance to ZooKeeper. The Helix participant may be implemented in a Java Virtual Machine (JVM) or Node.js.

Figure 4:
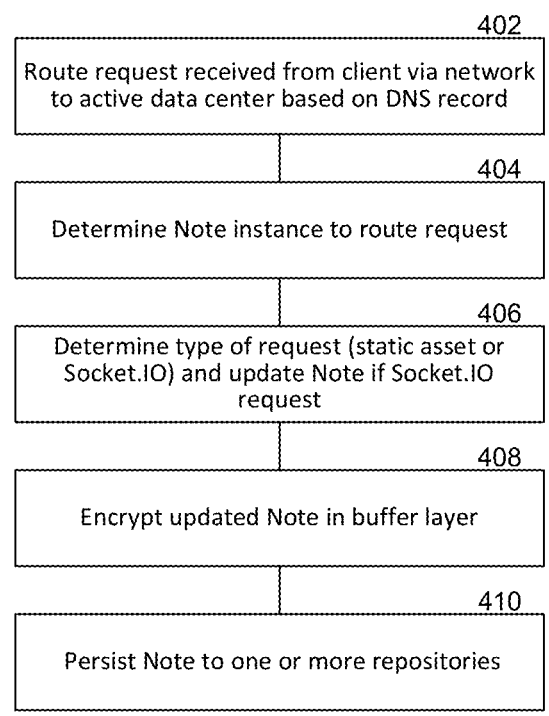
FIG. 4 depicts a flow chart of an exemplary method for handling a Note request in the high availability architecture of FIG. 3.

The communication between each of the aforementioned data center components is now described in an exemplary method depicted in FIG. 4. The method is described with reference to particular components in FIG. 3.

Referring now to FIG. 4, in step 402, for example, when a user requests access to a note using a uniform resource locator (URL) containing a Note ID, the request is forwarded to the active data center using DNS records. When the hardware LB 306 in the active data center receives a request, it in turn, routes the request to one of the software LB 308 servers in the software load balancer layer.

In step 404, the software LB 308 first determines the type of request, static asset or Socket.IO, and then the software LB 308 routes the request to the node (Node.js instance) 316 on an associated Notes servers 312. Implementing multiple Notes servers 312 leads to increased bandwidth for handling user requests and allowing for multiple instances on each server allows the system to be highly scalable as well. In step 404, the software LB 308 can additionally determine if the Notes server 312 on which the request is to be handled is located in the currently active data center. The request can then be routed to the appropriate data center.

In step 406, at the node 316, the request is checked to determine if it is valid, e.g., the node is allowed to serve that. If the request is for a static asset, then every node is allowed to serve it. (As mentioned earlier, HAProxy load balances static asset requests to make sure one node does not end up with all the requests.) If it is a Socket.IO request, the node determines which Note the request is for and checks with the Helix participant to make sure it is responsible for serving requests for that Note. In some embodiments, if the Note requested is not supposed to be served by the node, the node 316 consults the Helix participant to determine the address of the node (Notes instance) that the request should be sent to instead. The Helix participant of the node 316 can request the address of the Notes instance from an instance assignment manager, such as a Helix controller 318 in the node. The instance assignment manager accesses the mapping it maintains and stores in ZooKeeper and sends the instance assignment back to the Helix participant of the Notes instance. The node 316 will then send the client the information it needs to resend the requests to the correct Notes instance.

Because each Notes instance has the information it needs to accept requests that it should be handling and redirect requests that it should not, the overall system ensures that that all client, or user requests to access the same Note will ultimately be handled by the same Notes instance.

Once the client receives a response indicating what Notes instance can serve its requests, the client resends an updated request now also specifying the intended Notes instance, in the form of a URL containing both a note ID and a Notes instance ID, for example. Again, the DNS records ensure that the request is forwarded to the active data center's hardware LB 306, which routes the request to one of the software LBs 308, which sends the request to the intended node 316.

Referring again to step 406, once the request is received at the appropriate node 316, the node may determine which type of request is being received, e.g. static asset or Socket.IO. If the request is Socket.IO, the node sends the user all the content needed for the front-end UI to display the note and will maintain the network connections needed to receive edits to the Note from the user.

In step 408, each of the edits to the Note is received by the node 316 and is encrypted and stored within a local in-memory cache or buffer, in order to complete the encryption process and prior to being persisted to various other storage devices. The Notes data may be encrypted and the encryption key may also be encrypted in order to provide increased security for each stored Note.

In step 410, the node 316 persists each change made in response to the user request immediately in the datastore 324. Next time the node 316 needs to access the Note and a current version of the Note is no longer in local storage, it can retrieve the latest snapshot version from the datastore 324. Working with the datastore 324 makes it possible to reduce the frequency and volume of full text "snapshots" uploads and thus the requirement for input/output, storage and computing capabilities of the primary repository 310. It also helps ensure that even when a Notes instance fails a certain time after it last saved a snapshot of a note in the primary repository 310, the latest state of the note can be recovered. In step 410, the node 316 also persists full text, e.g., snapshots, of the Note to the backup, or primary repository 310 according to a predetermined schedule, such as every ~30 s.

Additional components of the exemplary Notes server are now described with reference to FIG. 5.

Figure 5:
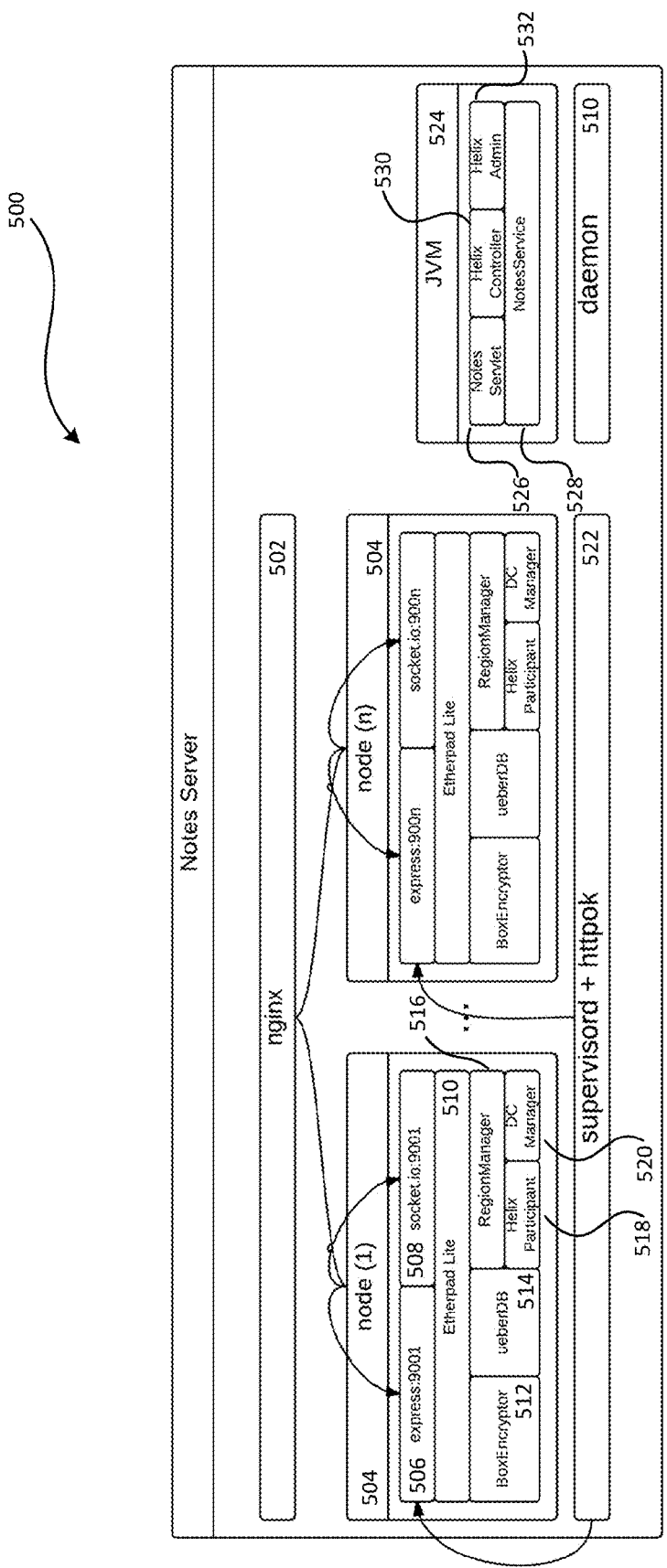
FIG. 5 depicts a diagram illustrating an example document server capable implemented in the high availability architecture of FIG. 3.

FIG. 5 depicts an exemplary Notes server 500. Each Notes server 500 includes various nodes 504, which may be implemented using, for example, Node.js. Each node 504 may run an instance of the Notes application and a Helix participant 518, as previously described. Furthermore, each node may be assigned to a particular number of regions by, for example, the Helix controller. The assigned regions may be handled by a region manager 516, also running on the node. To expedite reads from and writes to the datastore an abstraction layer may further be implemented inside the Node.js instance. The abstraction layer can act as the in-memory cache (buffer) and may include, for example, ueberDB 514.

The node may also run an instance of a pad (Note) editor 510, such as Etherpad or Etherpad Lite, which provides the front-end (e.g., user interface) editing service for the Note. Socket.IO 508 is also run on each node to communicate dynamic requests to the node and to reflect the Note edits to the user on the front-end UI. The static request handler 506, e.g., Express, runs on each node as well to handle any static request received by the node.

Each node 504 utilizes one central processing unit (CPU) core and one thread. The node 504 keeps track of a subset of notes it should be serving based on information received from the Helix participant 518. It communicates with connected clients using Socket.IO for those Notes. In addition, it maintains current versions of the Notes in a local storage (in-memory cache) and persists various versions in the primary repository and datastore.

A region manager 516 is a component in the node responsible for facilitating communication between the Helix participant and other components in the node. When the Helix participant experiences a state change, the region manager communicates the change to all relevant components. When a component needs information from the Helix participant (such as the regions or Notes that a node is responsible for), the component talks to the region manager, which fetches the relevant data from the Helix participant, converts the data into a form that the component can understand, and returns the converted data to the component. The region manager also facilitates communication between the data center manager 520 and other components. For example, it notifies all other components when the data center manager indicates that the data center the instance is in has become active or non-active. Since the region manager is inside the node, it may be implemented using Node.js.

The Helix participant 518 communicates with an instance assignment manager 530 and passes information received from the instance assignment manager 530 to the node 504 (usually through the region manager 516). Such information can be an instance assignment which assigns a Notes instance to handling a user request. It can also be a list of Notes that should be served by a particular node 504. Accordingly, the Helix participant may aid in distributing the Notes across the Node.js instances, or nodes. As previously discussed, the Helix participant 518 may claim an ephemeral ZooKeeper node and announce membership to the region manager 516 as well as listen for state changes and drop/acquire regions as appropriate.

The Helix participant 518 may also be responsible for handling certain types of node failures. For example, expected node shutdowns can result in the participant 518 renouncing its membership. If the supervisor 522 successfully restarts a downed node within five seconds (5 s), the Helix participant reclaims its membership. However, if an unexpected node shutdown occurs in which the node is not restarted within five seconds (5 s), then the membership is revoked after 5 s due to loss of ownership in the ephemeral node. Finally, if a node is hanging (idle) then it results in the membership being revoked after 5 s.

Additional failure modes may also exist. For example, in the case of network partitioning, where an instance, or node is partitioned from the cluster, the Notes served by that instance will be available in read-only mode. In such a case, the node periodically retrieves (every ~100 ms) updated state information about the cluster and what regions to map to a particular instance. The node also detects partitioning if it is unable to retrieve the aforementioned state such as, for example, with connectivity loss. If the node is partitioned for longer than 5 s, then it will result in a self-shutdown. In another failure mode, if a node hangs for more than 5 s, and can detect this fact after it has become responsive again, the node will trigger a self-shutdown. This shutdown is performed to ensure the consistency of changes and to avoid corrupting revisions in cases where a region has rebalanced while a node is hung. In yet another failure mode, the supervisor periodically performs an external health check to ensure that the node, e.g., Node.js instance, is up and responding to HTTP requests. When this health check fails, the supervisor kills and restarts the node. This type of failure mode is further discussed in detail with reference to FIG. 6.

The instance assignment manager 530 maintains the mapping between Notes and Notes instances that is communicated to the Helix participant 518 and the region manager 516. One approach of creating the mapping is to assign the Notes into a predetermined number of groups or regions, e.g., cluster, which is typically greater than the number of Notes instances 502, and allocate each region to one of the Notes instances. In most embodiments, there may be one cluster per data center.

The instance assignment manager 530 and Helix participant 518 can be implemented together using the Apache Helix architecture. The instance assignment manager 530 may be, for example, a Helix controller and the Helix participant 518 being an agent. A single instance assignment manager 530 may be active in each data center, though there is one instance assignment manager running per Notes server. So, all except one instance assignment manager 530 are in standby. The active instance assignment manager 530 can monitor when participants join or leave Notes servers as well as rebalancing resources among active participants in the data center cluster. Additionally, if the instance assignment manager 530 is notified that a node is in/out of commission from the Helix participant 518, the instance assignment manager 530 updates the mapping to include/exclude the node and notifies the affected Notes instance. This rebalancing can also occur on a server level. To assign a Notes instance to handling a user request for accessing a Note, the instance assignment manager 530 communicates the assignment to the Notes instance mapped to the Note through the associated Helix participant 518, and the Notes instance adds the Note to the list of Notebooks and Notes it serves.

A supervisor 522 is also run on each node. The supervisor 522, e.g., "supervisord", may be a process manager utilized to manage multiple nodes, e.g., Node.js instances on a particular Notes server 500. The supervisor 522 may be responsible for starting the N number of nodes on each Notes server. The N number of instances may be configurable and as such may vary dependent on server and data center. In some embodiments, the number of nodes is dynamic and depends on the load being handled by the nodes on a particular server as well as the load on a particular data center. The supervisor 522 may also assign ports for each instance to listen to for requests on a particular server, start a node during a code deployment, and automatically restart any nodes which were killed to prevent data loss. The supervisor 522 also monitors each node to ensure that it remains running. In further embodiments, the supervisor can provide manual management of instances.

A data center manager 520 may monitor the load of an active data center and determine how data center resources are distributed. An instance of BoxEncryptor 512, which is used to encrypt Notes and encryption keys as previously discussed, may also exist on each node 504.

The Java Virtual Machine (JVM) 524 may host the Helix framework, including the Helix administrator 532 and Helix controller 530 which communicate with the Helix participant 518 agent on each node through ZooKeeper. Additionally the JVM can provide the Notes servlet 526 and Notes service 528. The JVM may also be coupled to a daemon 510, which is responsible for detecting when the JVM crashes and bringing up a new instance of the JVM.

Figure 6:
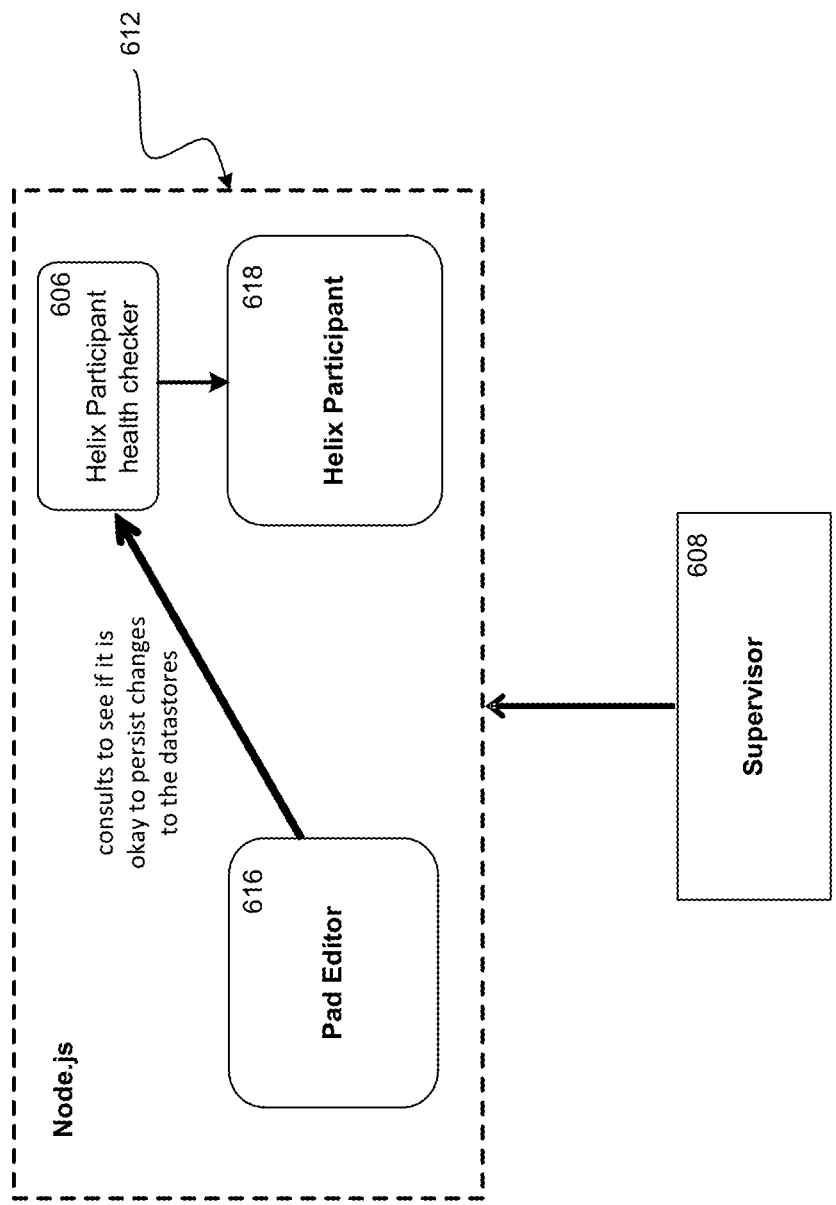
FIG. 6 depicts a diagram illustrating example health check communication among certain components of a high-availability architecture.

FIG. 6 depicts a diagram illustrating an example health check communication among certain components of the high-availability architecture. The overarching strategy behind the health checking is to fail quickly, which results in a clean instance (node) shutdown whenever possible. The supervisor 608 is then responsible for restarting the node. There are two types of health checks implemented in each node 612 of the Notes instance. The first is an internal, or self health check that verifies that the Helix participant is running properly. For example, if there is a failure to retrieve an updated instance assignment, this health check fails. Also, as provided through Helix, the Helix participant 618 implements its own health check to ZooKeeper to make sure that its dependencies are working.

In the internal, self-health check, a component in the node 616 known as the Helix participant health checker 606 periodically performs the health check to determine whether the Helix participant 618 is healthy. If the health check fails, the pad editor 616 stops processing user requests for write access to the Notes. If the health check continues to fail for a certain period of time, the node 612 shuts itself down. Because the node also hosts the Helix participant 618, this shutdown prompts the instance assignment manager (Helix controller) to update the list of active Helix participants and remap the assignments from Notes to Notes instances.

The second type of health check is an external health check performed on the node via the supervisor 608. Supervisor makes HTTP requests to the running Node.js (e.g., node) and ensures the appropriate responses are received and within an allotted time frame. If the health check continues to fail, the supervisor shuts down the node 616, e.g., end the application process and the Helix participant 618. This shutdown again triggers an update to the list of active Helix participants on the Notes server. Supervisor is then responsible for bringing up a new instance, e.g., running the application instance on a new node.

The aforementioned health checks eliminate inconsistency between the node 616 and the Helix participant 618 of a Notes server. As a result, when the Helix participant 618 is down, the node 616 does not proceed with an outdated set of Notes when those Notes have been reassigned to another Notes instance. When the node is down, the Helix participant 618 is also down, ensuring that the regions owned by the instance are redistributed.

Figure 7:
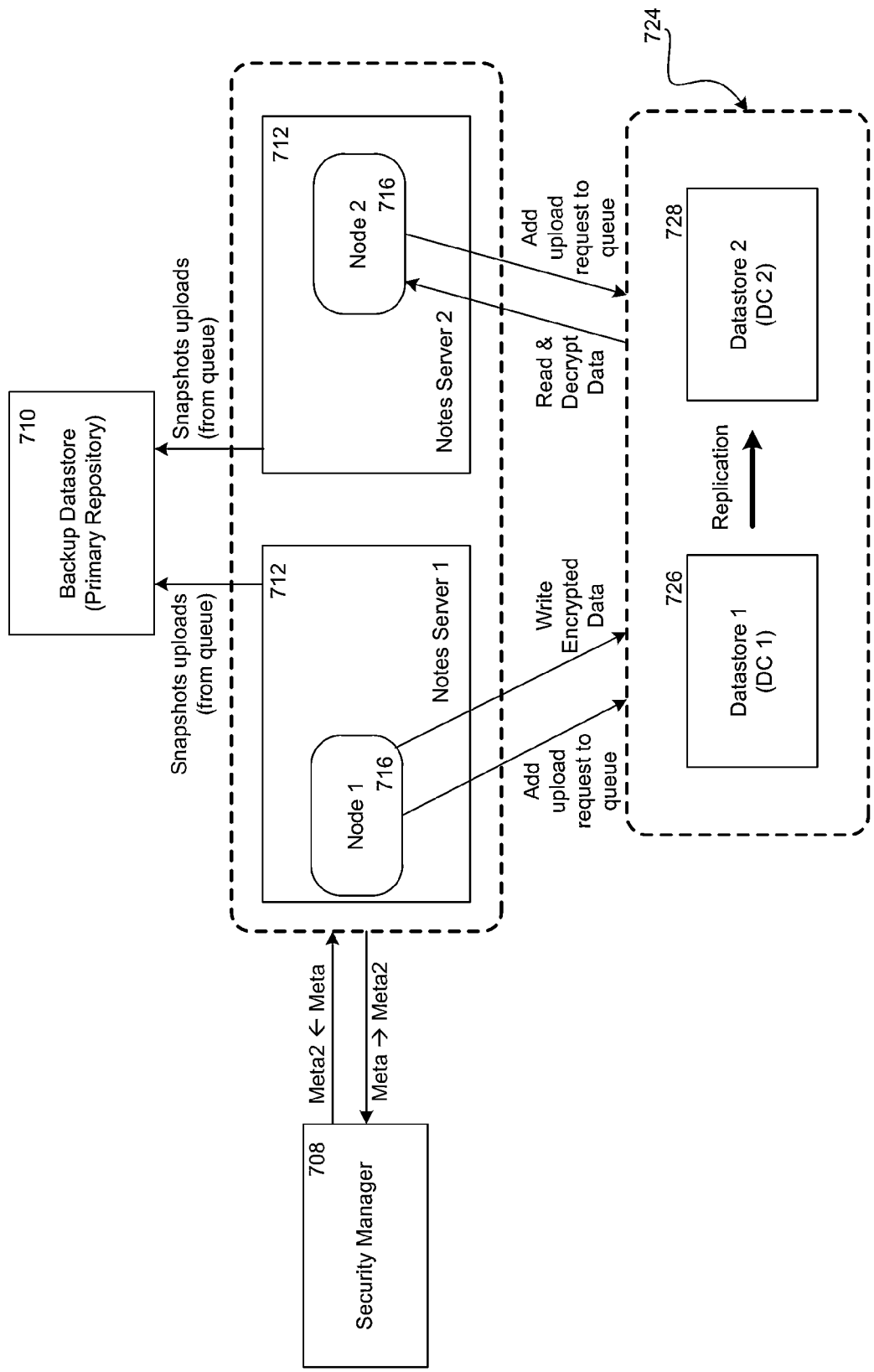
FIG. 7 depicts a diagram illustrating example encryption implemented in a high-availability architecture.

FIG. 7 contains a diagram illustrating example security measures in the high-availability architecture. A security manager 708 manages security information for protecting the communication between a Notes server 712 and a datastore 726. Generally, the node 716 of the Notes server 712 obtains security information from the security manager 708 that it uses to obtain encryption and decryption keys from the datastore 726. The node 716 then uses the encryption key to encrypt any data it sends to the datastore 724. The node 716 also reads encrypted data from the datastore 724 to process requests sent to it, and uses the decryption key to decrypt the data.

In addition, the node 716 en-queues snapshot-upload jobs in the datastore 726 before it executes the job to further facilitate error recovery. The node then de-queues each job right after the execution of the job. When the primary repository 702 is down, the queue grows until the primary repository 702 is running again. If a Notes instance 716 is down before executing a queued snapshot-upload job, the replacement Notes instance can continue to execute the job according to the predetermined schedule.

When the aforementioned security manager 708 fails or when the encryption or decryption is unsuccessful, all users can get disconnected immediately. This prevents data loss, as further described in the method depicted in FIG. 8. Additionally, the datastore 708 can be replicated, or copied 710 to further high availability and prevent data loss.

Figure 8:
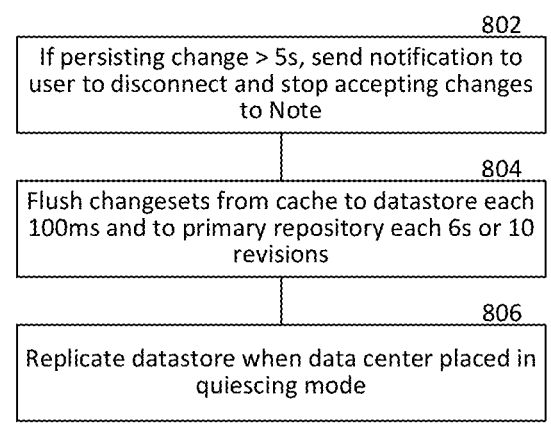
FIG. 8 depicts a flow chart of an exemplary encryption method in the high availability architecture of FIG. 3.

FIG. 8 depicts an exemplary method of data loss prevention implemented in the high-availability architecture of the collaborative cloud-based platform. On the server-side, in order to prevent any data loss, various processes are run to ensure that Note data is not lost and the most current version of the Note is stored prior to any disconnection or interruption in the node. Specifically, the following method may be implemented in the data center to maintain that no more than five seconds (5 s) of data loss will occur on any given Note.

In step 802, the Notes instance can time the steps required to persist a change (e.g., edit) to a particular Note and check if steps combined take more than five seconds (5 s). If a change is taking longer than five seconds, the instance sends a notification, or similar communication, to the client to disconnect the user and stop accepting any changes to the Note. By preventing the user from making further changes, the corresponding data to those changes will not be lost during an interruption.

In step 804, the Notes instance can provide back-up persistence such that any possible data loss due to disconnection is minimal. For example, the Notes changesets are queued in the in-memory cache and flushed in intervals to the datastore (HBase), e.g., every ~100 ms. Additionally, a snapshot of the Note can be uploaded to the primary repository after every ten revisions are made to the Note or every six second (6 s) interval in which a change has been detected and the Note has not been uploaded or stored on the primary repository.

Finally, in step 806, the Note can be replicated on the HBase datastore. The replication can occur in a master-master fashion. For example, this data replication occurs when flipping active data centers. The active data center is put into quiescing mode to ensure all data is replicated prior to activating another data center. When the data center is placed in quiescing mode, all memory is flushed to the datastore for that data center. This replication can cause a lag to occur prior to serving traffic (e.g., requests) in the new active data center. The lag, for example, may be approximately five seconds (5 s). The aforementioned data center flipping is further described in the following paragraphs with reference to FIG. 9.

Figure 9:
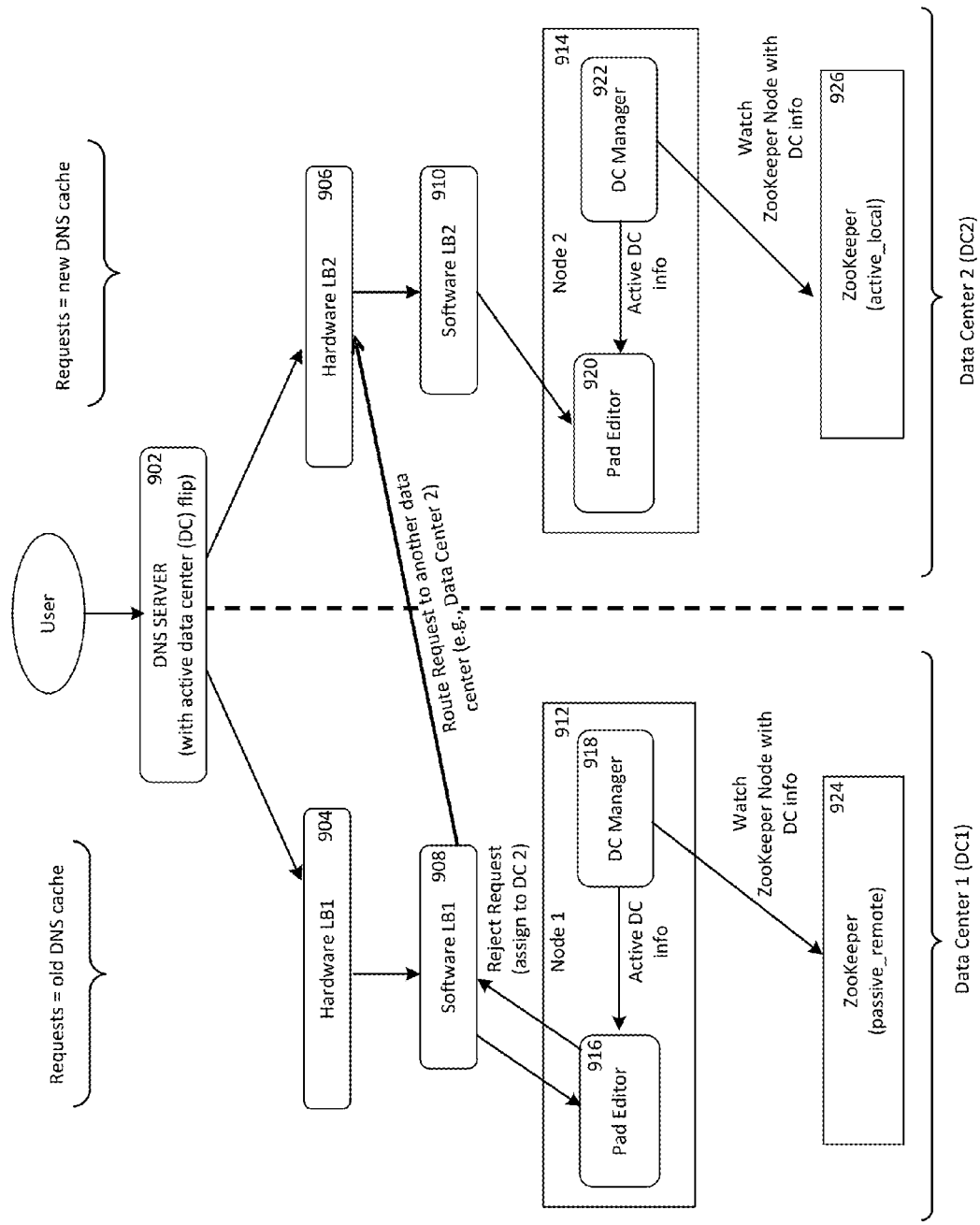
FIG. 9 depicts a diagram illustrating two data centers implementing the high availability architecture of FIG. 3.

FIG. 9 contains a diagram illustrating an example of data centers providing the high-availability architecture supporting the cloud-based collaboration platform. As shown, two or more data centers may provide the high availability platform, however, only one is active at a time. ZooKeeper 924 or 926 in each data center keeps track of whether the data center is active or not. Records in the DNS server 902 ensure that new requests are sent only to the hardware LB 908 of the active data center. In case of DNS or user errors, such as when a user sends a request to a cached, old IP address, the user request is routed to the inactive data center, through the hardware LB 906, a software LB 910, and finally to the pad editor 916, which asks the DC manager 924 if the data center is active.

When the DC manager 918 indicates that another data center is active, the pad editor 916 rejects the user request and informs the client which data center the request should be sent to instead. When the client makes a new request specifying this new data center and it reaches the software LB1 908, the software LB1 reroutes the user request directly to the hardware LB2 906 in the active data center. The hardware LB2 906 then forwards the request, which is then handled as indicated in FIG. 4. Having multiple data centers can facilitate general maintenance and disaster recovery of the collaboration platform.

Figure 10:
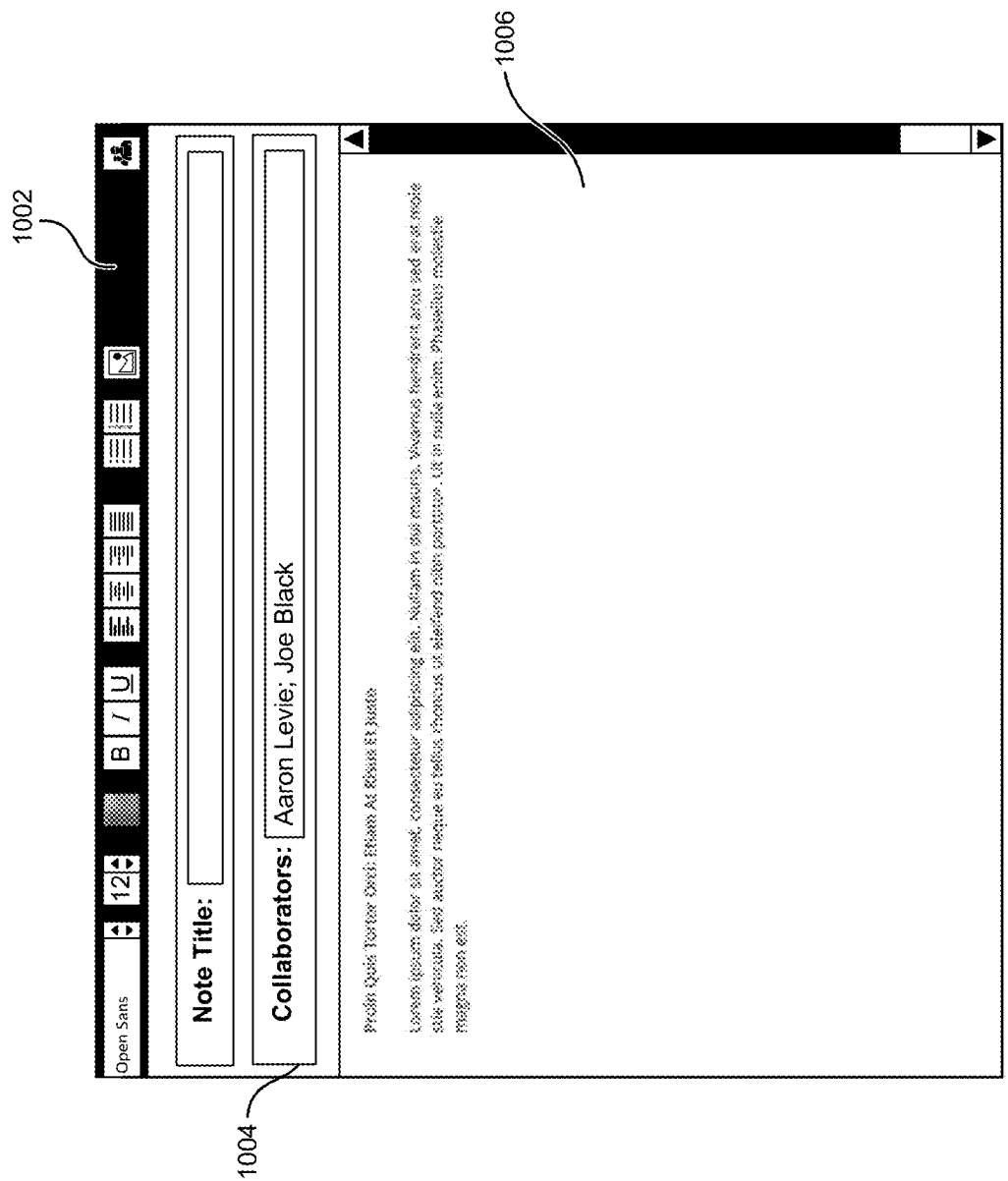
FIG. 10 depicts an exemplary screenshot of a user interface for creating a new work item supported by the high availability architecture in the data centers of FIG. 9.

FIG. 10 depicts an exemplary screenshot of new Note being created in the high availability architecture system as described herein. The Note can include various collaborators provided access to the Note. Each time that a collaborator access the Note, the request and all corresponding updates are handled on the node to which the Note is currently assigned (by Helix). Accordingly, if two or more collaborators edit the same portion of the Note concurrently, the node can handle any errors or conflicts without having to communicate with another node.

When a Note is served to a client, it is served through a first iframe that routes through the cloud-based platform. A second iframe access the Notes backend Express layer and receives static assets (HTML, toolbar images, etc.). The second iframe is used to build a third iframe, which provides the editor via JavaScript. Accordingly, when an initial client handshake occurs, the client queries Notes via, e.g., an XHR AJAX request to find out which node it should communicate with for all future Socket.IO persistent communication. This information is derived from the state managed by Helix, as described above with reference to, e.g., FIG. 5. The client's Socket.IO module makes a Socket.IO connection to the Notes node it received from the node request mentioned previously. When the connection is established, the client requests the contents of the Note. Acquisition of Note content pulls from local memory, then the datastore, then the primary repository until it locates the requested Note data. Ultimately, the client receives the contents of the Note and the Socket.IO connection remains open to receive changes made to the Note. Accordingly, the user inputs, e.g., keystrokes, will result in additional communication with the Notes instance via Socket.IO. If a client connection is lost for any reason, the aforementioned handshake process will repeat. For example, clients may reconnect due to client network connectivity issues and clients may reconnect due to regions being rebalanced.

Figure 11:
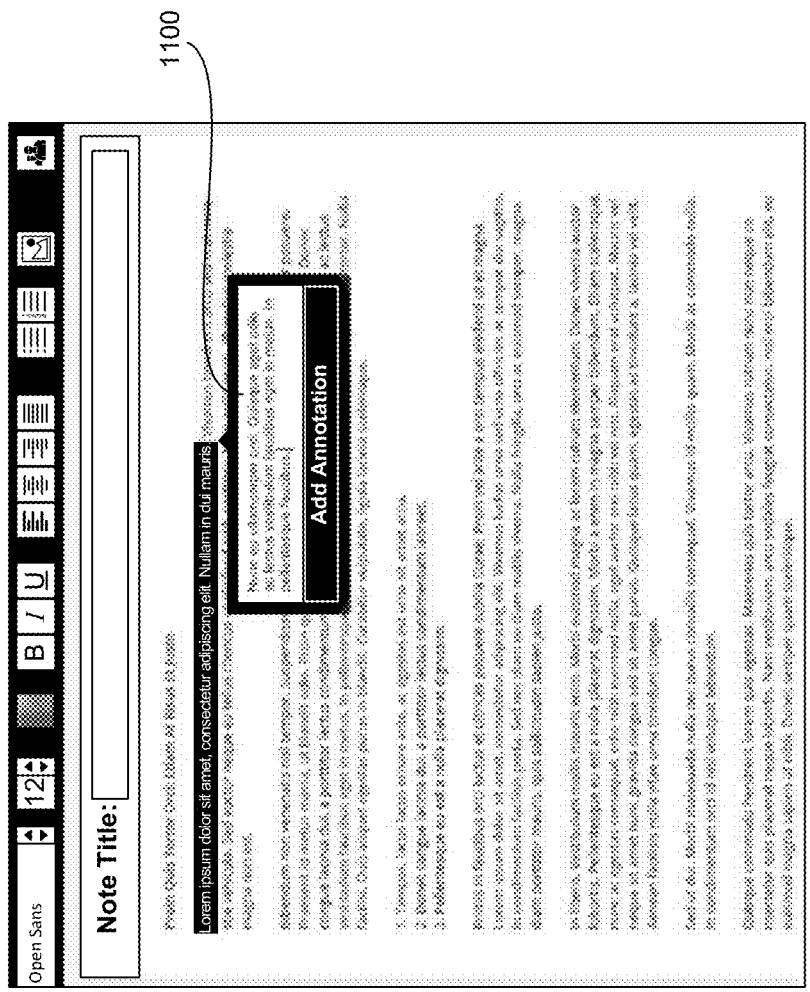
FIG. 11 depicts an exemplary screenshot of a user interface providing collaborative editing to a document which is supported by the data centers of FIG. 9.

FIG. 11 depicts an exemplary screenshot of revisions, e.g., annotations being made to a Note through the client side UI implemented through a pad editor on the node for that Note. As shown, the user may enter the annotation to the Note and the annotation may be reflected in real-time to both user and any collaborators of the Note. The annotations are persisted in the system each 100 ms, which facilitates in preventing data loss. Additionally, for example, if problems exist in persisting the annotation to the Note, e.g., there is a lag while typing the annotation, the user will be disconnected and no longer permitted to type. This may be visible to the user as a loss of cursor in the Note and/or a notification generated in the GUI informing the user of the connection loss.

Figure 12:
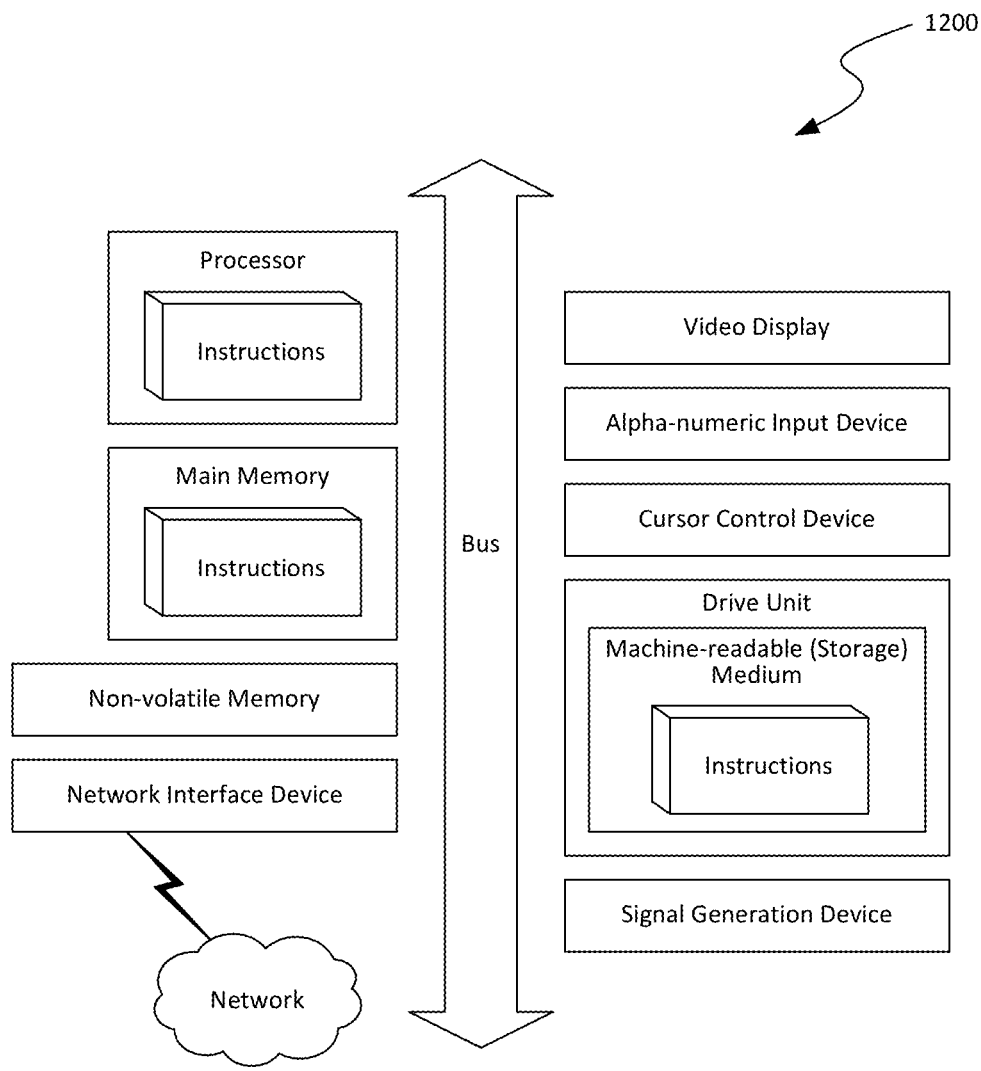
FIG. 12 shows a diagrammatic representation of a machine in the example form of a computer system within which a set of instructions, for causing the machine to perform any one or more of the methodologies discussed herein, may be executed.

FIG. 12 shows a diagrammatic representation of a machine in the example form of a computer system 1200 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein", "above", "below", and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶16, other aspects may likewise be embodied as a means-plus-function claim, or in other forms, such as being embodied in a computer-readable medium. (Any claims intended to be treated under 35 U.S.C. §112, ¶16 will begin with the words "means for".) Accordingly, the applicant reserves the right to add additional claims after filing the application to pursue such additional claim forms for other aspects of the disclosure.

What is claimed is:

1. A high-availability system for managing documents on a cloud-based computing platform, the system comprising:
   two or more load balancers configured to route requests received from a client;
   one or more document servers for handling the requests routed by the two or more load balancers,
      wherein each document server includes multiple document server instances, each of which is responsible for processing edits for particular documents, and
      wherein each document is dynamically associated with one document server instance;
   a primary repository for periodically uploading snapshots of documents from the one or more document server instances, and
   a secondary repository for storing edits to the documents.

2. The high-availability system of claim 1 wherein, in response to uploading snapshots, the primary repository generates one or more notifications for collaborators associated with respective documents for which the snapshots are uploaded.

3. The high-availability system of claim 1, wherein the snapshots include copies of full text documents, and wherein the snapshots are uploaded to the primary repository at predetermined time intervals.

4. The high-availability system of claim 1, wherein the edits to documents are uploaded to the secondary repository in real-time or near real-time.

5. The high-availability system of claim 1, further comprising a security manager component for encrypting and decrypting document data for the document server instance, wherein the document data includes any one or more of: full document content, document changes and encryption keys.

6. The high-availability system of claim 1, wherein each of the multiple document server instances includes a buffering layer implemented in an abstraction layer.

7. The high-availability system of claim 6, wherein document data is:
   stored in the buffering layer;
   encrypted in the buffering layer through the security manager component; and
   uploaded, in encrypted form, to the secondary repository.

8. The high-availability system of claim 7, wherein each document server instance on a document server includes a respective upload queue, each respective upload queue including snapshots of documents queued for upload to the primary repository, and wherein the snapshots in each upload queue are associated with documents being accessed through the respective document server instance.

9. The high-availability system of claim 1, further comprising an instance assignment manager for maintaining an assignment of each document to a document server instance on a document server, wherein, if a change in status of a document server or document server instance is detected, the instance assignment manager updates the assignment according to the change.

10. The high-availability system of claim 9, wherein the instance assignment manager divides a document storage space into zones, associates a document server instance with one or more of the zones, and assigns the documents into the zones.

11. The high-availability system of claim 1, wherein one or more of the load balancers is coupled to a proxy server, and wherein any requests for static assets received from the client are routed by the proxy server.

\* \* \* \* \*